Sept. 23, 1958     D. W. BERREMAN     2,853,617
FOCUSING CRYSTAL FOR X-RAYS AND METHOD OF MANUFACTURE
Filed Jan. 27, 1955     2 Sheets-Sheet 2
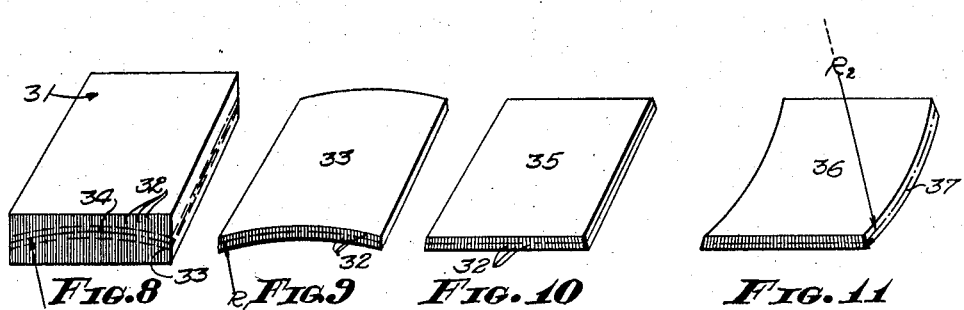
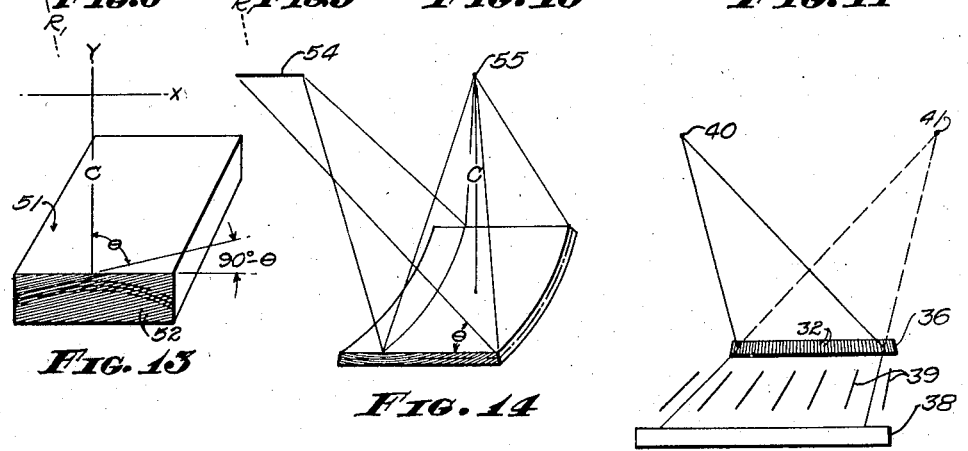
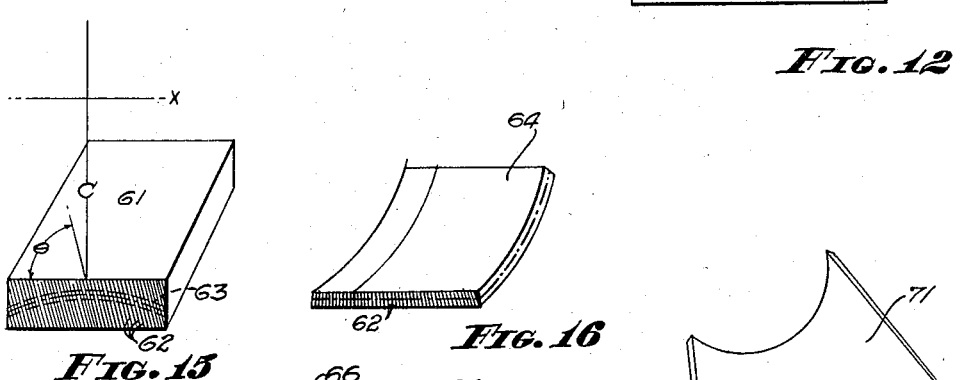
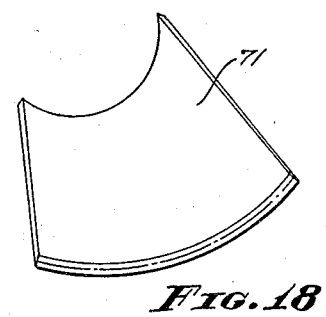
INVENTOR.
DWIGHT W. BERREMAN
BY
ATTORNEYS

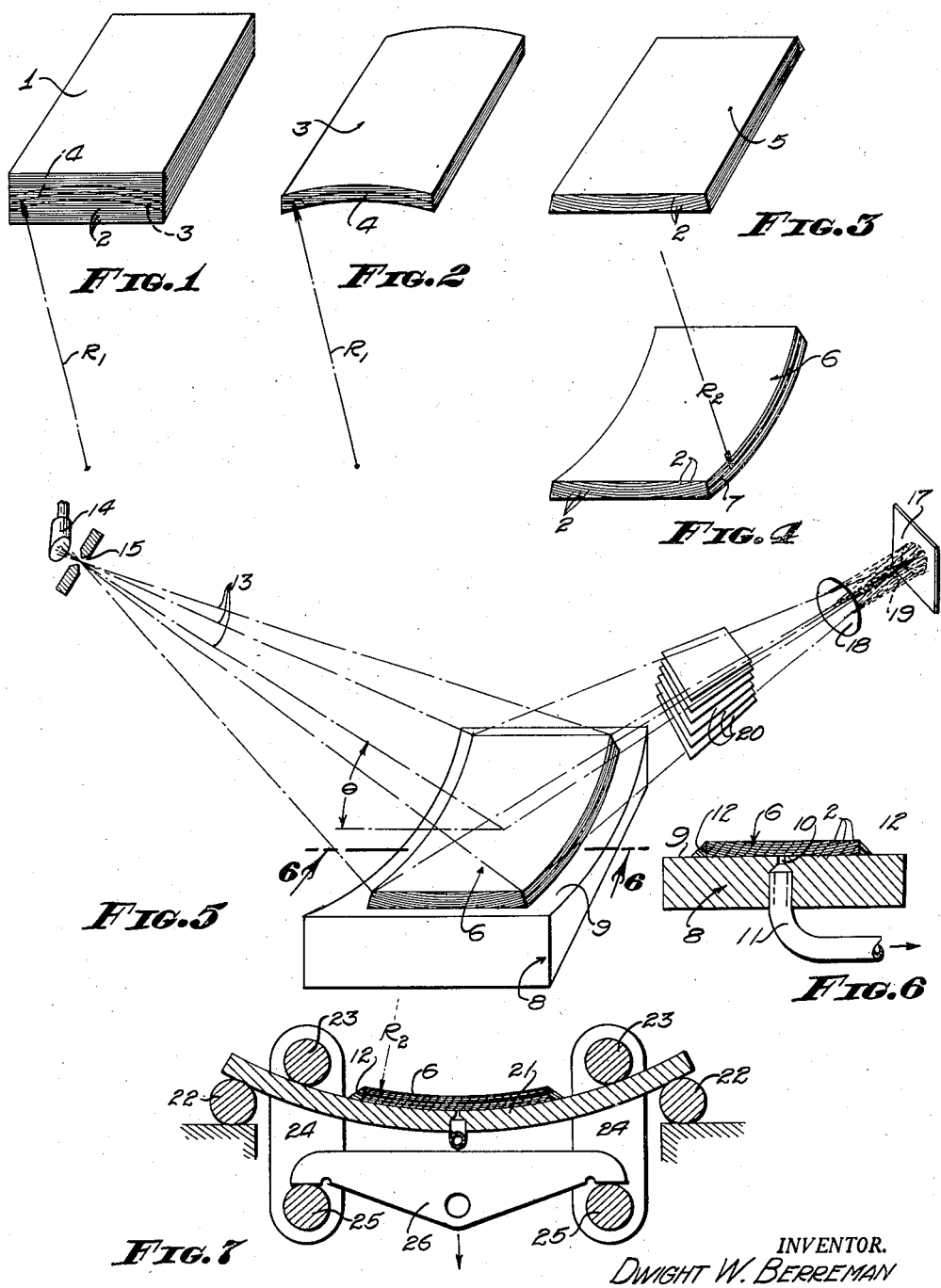

United States Patent Office 2,853,617
Patented Sept. 23, 1958

2,853,617

FOCUSING CRYSTAL FOR X-RAYS AND METHOD OF MANUFACTURE

Dwight W. Berreman, Pasadena, Calif., assignor to California Institute Research Foundation, Pasadena, Calif., a corporation of California Application January 27, 1955, Serial No. 484,534

22 Claims. (Cl. 250—51)

My invention relates to X-ray focusing crystals and method of manufacture. The focusing of X-rays by crystals is accomplished by making use of the coherent scattering of X-rays from various points in the periodically repeated unit cells which form the lattice structure of the crystal. If the crystal is unstressed, the unit cells are all oriented in the same direction and the lattice structure defines atomic planes which are flat. In such case, plane and parallel incident X-rays are reflected in other plane and parallel directions. Heretofore, in order to focus X-rays with crystals, the atomic planes of the crystal lattice have been given a compound curvature about two principal radii by so bending the crystal itself. This results in such stressing of the lattice structure that irregular deformations often occur which seriously limit the sharpness of focus. Alternatively, two successive crystals have been employed each having a single principal radius of curvature. This results in severe loss of intensity.

Accordingly then, included in the objects of my invention are:

First, to provide a focusing crystal and method of manufacture wherein the crystal atomic planes defined by the crystal lattice are given a compound curvature with two principal radii of curvature without imparting a compound curvature to the crystal itself so that the mid surface or the neutral plane of the crystal is a smooth singly warped surface, that is, a surface with only one finite principal radius of curvature, which remains unstretched and stresses on the lattice structure are minimized.

Second, to provide a focusing crystal and method of manufacture which by effecting compound curvature of the crystal atomic planes without compound curvature of the crystal itself permits sharp focusing of X-rays with a minimum of loss in intensity.

Third, to provide an X-ray focusing crystal and method of manufacture wherein crystals may be designed for focus by reflection or transmission of X-rays, whereby the focusing crystal may be employed in a wide variety of X-ray equipment including X-ray monochromators and X-ray spectrometers.

Fourth, to provide an X-ray focusing crystal which may be flexed so as to vary one of the principal radii of the crystal atomic planes with a minimum of distortion of the lattice structure.

With the above and other objects in view as may appear hereinafter, reference is directed to the accompanying drawings in which:

Figure 1 is a substantially diagrammatic, perspective view of a crystal block indicating the segment to be cut therefrom in order to form a focusing crystal.

Figure 2 is a substantially diagrammatic view of the crystal segment cut from the block shown in Figure 1.

Figure 3 is a substantially diagrammatic, perspective view showing the crystal segment after being flattened.

Figure 4 is a similar view showing the crystal curved cylindrically about a transverse axis.

Figure 5 is a substantially diagrammatic, perspective view showing the crystal segment on a backing plate and illustrating the manner of its use in a monochromator.

Figure 6 is a transverse, sectional view through 6—6 of Figure 5, illustrating the manner in which the crystal segment is held to the base block.

Figure 7 is a substantially diagrammatic view illustrating the manner in which the crystal segment may be incorporated in an X-ray spectrometer.

Figure 8 is a diagrammatic, perspective view of a crystal block with the crystal atomic planes perpendicular to the surface to form a transmission type of X-ray focusing crystal wafer.

Figure 9 is a diagrammatic, perspective view of an arched wafer cut from the block shown in Figure 8.

Figure 10 is a diagrammatic, perspective view of the wafer when flattened.

Figure 11 is a diagrammatic, perspective view of the wafer when arched in its final form.

Figure 12 is a diagrammatic view of illustrating a manner in which the X-ray transmission focusing wafer is employed.

Figure 13 is a diagrammatic, perspective view of a crystal block with the crystal atomic planes in angular relation to the surface to form a modified X-ray reflecting crystal wafer.

Figure 14 is a diagrammatic, perspective view of the modified X-ray reflecting crystal wafer in its final form indicating a mode of use.

Figure 15 is a diagrammatic, perspective view of a crystal block showing the crystal atomic planes in such angular relation to the surface to form a modified X-ray transmitting crystal wafer for optimum spectral resolution.

Figure 16 is a diagrammatic, perspective view of a modified X-ray transmitting crystal wafer in its final form.

Figure 17 is a diagrammatic view illustrating a manner in which the crystal shown in Figures 15 and 16 may be used.

Figure 18 is a perspective view of a crystal wafer warped to form a segment of a conical figure.

Reference is first directed to Figures 1 through 4. My point focusing crystal is formed from a crystal block 1. A crystal block is selected having a lattice structure defining crystal atomic planes 2 oriented in a preselected relation to the surfaces of the block. A thin arched section or wafer 3 is cut from the block. The exposed surfaces as well as the mid-surface or neutral surface 4 of of the wafer are smooth singly warped surfaces which can be flattened to a plane without stretching or cutting the surface.

As will be brought out in more detail hereinafter, the curvature of the section is an arc or any desired curve of a singly warped surface and thus may be a circle, ellipse, hyperbolic cosine curve, parabola, or other suitable curved line. Also while the type of the arc may not vary throughout the crystal block, the scale of the arc may vary so that the wafer may be the segment of a cone as well as a cylinder. Still further, the atomic crystal planes may be parallel, perpendicular or at any other preselected angle to the surface of the block.

In the embodiment shown in Figures 1 through 4 the selected crystal atomic planes determined by the lattice structure are parallel to the upper and lower surfaces of the block 1 and the arc defined by the wafer is constant from end-to-end of the block so that the wafer is a cylindrical segment.

The arched wafer 3 is then flattened as shown in Figure 3 to form a flat wafer 5. The originally flat crystal atomic planes 2 now become arched or warped and the surface forms a chord. The wafer 5 is then bent into its final form; designated 6, as shown in Figure 4 by arching the crystal wafer about an axis at right angles to the original curve to form again a singly warped surface.

As in the initial cutting of the wafer 3, the curve of the final wafer 6 may be an arc of a circle, ellipse, parabola, or other suitable curve. It will thus be seen that the crystal atomic planes are curved concentric with the arched surface of the final wafer 5. While the mid-surface or neutral surface 7 of the final wafer 6 is a singly warped surface, the crystal atomic planes define doubly warped surfaces, that is, surfaces having two finite principal radii of curvature.

Assuming that the original neutral surface 4 is a segment of a cylinder having a radius $R_1$, the final neutral surface 7 is a cylinder of radius $R_2$ wherein:

$$R_2 = -R_1 \sin^2 \theta$$

where $\theta$ is the Bragg angle for X-ray reflection of the desired wave length. The minus (−) sign indicates that, at the center of the final wafer the final radius of curvature is in the opposite direction from the original radius of curvature.

By way of example a focusing crystal was made from a quartz wafer approximately 0.025 cm. thick. The initial radius $R_1$ of the neutral surface of the wafer as cut from the crystal block was approximately 105 cm. The radius of the neutral surface of the final wafer was approximately 95 cm. The resulting crystal was thus designed to focus X-rays having a Bragg angle $\theta$ of 71° 42′.

The final crystal wafer may be secured in its final form by various means. One satisfactory means is illustrated in Figures 5 and 6 wherein the crystal wafer is incorporated in a point focusing monochromator for low angle X-ray diffraction pattern study of large molecules and the like.

The crystal wafer 6 is mounted on a base block 8 which may be formed of metal and provided with a cylindrical face 9 conforming to the desired curvature of the final wafer 6. Within the space to be occupied by the wafer 6 is a port 10 connected to a vacuum line 11. Suitable sealing material 12 such as wax or the like is applied around the margin of the wafer 6 and the air is withdrawn from under the wafer so as to cause the wafer to be held tightly to base block 8. Once the air has been withdrawn the vacuum line 11 may be closed and sealed off assuming, of course, that a vacuum tight seal has been formed with the sealing material 12.

The base block 8 with the crystal wafer 6 may then be incorporated in an X-ray monochromator so that incident X-rays 13 from an X-ray source 14 may pass through a suitable aperture 15 and be directed upon the crystal to form reflected X-rays 16 which tend to focus to a close approximation of a point at a focal plane 17. A sample 18 is interposed in the reflected rays, so as to produce scattered rays 19 which may be recorded on a photographic plate located at the focal plane 17.

In order to reduce X-rays scattered in a direction other than toward the focus by imperfections in the crystal wafer, or by incoherent scattering from the crystal wafer or by reason of other phenomena before they reach the sample, a converging solar collimator may be used. The collimator comprises a set of thin sheets 20 of lead or other X-ray absorbing material inserted between the crystal wafer and sample. The sheets are aligned along planes passing through a single line normal to the central beam which passes through the point focus.

Another application of my focusing X-ray crystal is in conjunction with an X-ray spectrometer as shown diagrammatically in Figure 7. When so used it is desirable to vary the radius $R_2$ of the crystal wafer. This may be accomplished by mounting the crystal wafer 6 on a flexible base 21.

The ends of the base 21 may rest on fulcrum bars 22. Inwardly from its ends at its upper or concave side, the base is engaged by thrust bars 23 which are connected by links 24 extending downwardly at the sides of the base 21 to cross bars 25 which in turn are engaged by a yoke 26 connected with a suitable adjustment means not shown.

The wafer 6 is secured to the base 21 in the same manner as in Figure 5 and thus flexes with flexure of the base 21. The magnitude of movement is not great, for example, the base 21 may vary in radius between 95 cm. and 50 cm. for X-rays of 1.54 A. to 1.12 A. if planes of spacing=0.81 A. are used and if $R_1$=105 cm. A range of movement is employed for X-rays of different wavelengths.

Reference is now directed to Figures 8–12. My focusing crystal may be arranged as a transmission type of X-ray focusing crystal as distinguished from the reflection crystal shown in Figures 1 through 7. The essential difference is that the crystal atomic planes are initially perpendicular instead of parallel to the surfaces of the crystal block. Thus, as shown in Figure 8 a crystal block 31 having vertical or traversing crystal atomic planes 32 is employed. An initially arched wafer 33 is cut to define a singly warped figure, with a singly warped neutral surface or mid-surface 34.

The wafer 33 is then flattened to form a flat wafer 35 wherein the atomic planes 32 warp so as to converge approximately toward a line. The intermediate wafer 35 is then curved to right angles to its initial axis to form a final wafer 36 defining a singly warped figure having a singly warped neutral surface or mid-surface 37, with the lattice structure defining doubly warped crystal atomic planes.

The crystal wafer 36 may be mounted on a very thin base block, not shown, in the same manner as the base blocks, 8 or 21, except that the base block is formed of material which is transparent to X-rays such as beryllium.

Such X-ray transparent block may be rigid or flexible depending upon the intended use of the focusing crystal. Essentially the X-ray optical system utilizing a transmission type focusing crystal is represented in Figure 12.

Alternatively, the base may be constructed as shown in Figures 5 and 7 except that an aperture may be provided and the margins of the crystal wafer suitably clamped.

The transmitting crystal wafer 36 is mounted with its convex side directed toward a surface 38. A suitable solar collimator 39 comprising properly disposed X-ray absorbing metal plates may be interposed. A point focus 40 and an apparent point image 41 is established by the crystal. If an X-ray source be located at the point focus 40, the surface 38 becomes a detector and an apparent image appears at 41. If the surface 38 be an X-ray source, as for example, radioactive material, then point focus image for a particular wave length of X-rays will occur at 40.

Reference is now directed to Figures 13 and 14. A crystal block 51 may be selected with its atomic planes 52, at an angle to the surface, for example, the angle may be 90°−$\theta$ where $\theta$ equals the Bragg angle.

Such an arrangement is suitable if it is desired to focus a particular wave-length of X-rays very accurately between a line source to a point detector, or a point source to a line detector.

A wafer of arcuate cross section is cut from the block, flattened, and then bent arcuately at right angles as in the first described structures to form a final wafer 53. Both the initial and final wafers define singly warped figures. Also the arcs may be those of circles, hyperbolic cosine curves, or other suitable curves.

A particular application may utilize a curve which may be expressed as $y=-c=\cosh x$ where $y$, $c$, and $x$ are shown in Figure 13, $c$ being the distance from the origin, $x=0$, $y=0$, to the nearest point on the crystal lamina.

In such application, the final wafer 53 should be a true circular cylindrical segment with radius of curvature also equal to *c*.

As indicated diagrammatically in Figure 14, a line focus 54 may be reflected to a point focus 55 or vice versa, the detector or X-ray source being at either location. This geometry provides optimum focusing of X-rays of a single wave-length to or from a point directly above the center of the crystal lamina, at a distance *c* above the lamina.

Reference is now directed to Figures 15, 16, and 17. The focusing crystal here shown is similar to that shown in Figures 13 and 14 except that the crystal atomic planes are arranged to transmit rather than reflect X-rays. In this case the crystal block 61 is arranged with the atomic planes 62 90° displaced from Figure 13 so that they define with the surface of the crystal block an angle of $\theta$ where $\theta$ equals the Bragg angle. The singly warped curvatures of the initial wafer designated 63 and final wafer designated 64 correspond to that shown in Figures 13 and 14.

As shown in Figure 17, X-rays are transmitted between a surface 65 and a point focus 67 and form an apparent line image 66. Either the surface 65 or the point focus 67 may constitute the location of the source or detector.

Reference is now directed to Figure 18 wherein a final wafer 71 is shown as being a conical segment as distinguished from a cylindrical segment. Otherwise the wafer may be similar to the previously described structures.

It will be observed from the various constructions illustrated that:

A. The angular relation of the crystal atomic planes may be selected from those varying between parallel and perpendicular to the crystal block.

B. Both the initial and final wafer are singly warped figures of any smooth transverse curvature.

C. The degree of curvature may be constant or may vary from end to end of either the initial or final wafer, providing that the figure remains a singly warped figure.

The method of producing the various constructions shown and described is essentially the same; namely, (1) Cutting an initial wafer of singly warped configuration with crystal atomic planes defined by the lattice structure in any selected orientation.

(2) Flattening the wafer to produce an intermediate wafer displacing the atomic planes about a single axis.

(3) Curving the intermediate wafer to produce a final wafer of singly warped configuration with the crystal atomic planes now displaced about two axes and having two principal radii of curvature.

It should be observed that many crystals capable of reflecting or transmitting X-rays may be employed.

However, the methods and constructions hereinbefore described are particularly suited for the more brittle crystals such as quarts, calcite or topaz.

Having thus described certain embodiments and applications of my invention, I do not desire to be limited thereto, but intend to claim all novelty inherent in the appended claims.

I claim:

1. A focusing crystal for X-rays in the form of a wafer having a singly warped curvature and having a lattice structure defining doubly warped crystal atomic planes.

2. A focusing crystal for X-rays as set forth in claim 1 wherein: said crystal atomic planes are substantially parallel to the warped surface of said wafer in the direction of its warpage and define arcs transverse to the direction of warpage of said wafer.

3. A focusing crystal for X-rays as set forth in claim 1 wherein: said crystal atomic planes are warped edgewise in the direction of warpage of said wafer, and are non-parallel in a direction transverse thereto.

4. A focusing crystal for X-rays as set forth in claim 1 wherein: said crystal atomic planes are so oriented with respect to the surfaces of said wafer as to reflect and focus incident X-rays of preselected wavelength.

5. A focusing crystal for X-rays as set forth in claim 1 wherein: said crystal atomic planes are so oriented with respect to the surfaces of the wafer as to transmit and focus X-rays of preselected wavelength therethrough.

6. A focusing crystal for X-rays as set forth in claim 1 wherein: said wafer has limited flexibility whereby the degree of its final warpage may be varied.

7. A focusing crystal for X-rays as set forth in claim 1, wherein: said crystal atomic planes intersect the surface of said warped wafer at such angles as to focus X-rays of a preselected wave length in a direction of a preselected real focus.

8. A focusing crystal for X-rays as set forth in claim 1, wherein: said crystal atomic planes intersect the surface of said warped wafer at such angles as to focus X-rays of a preselected wave length in a direction of a preselected virtual focus.

9. A focusing crystal for X-rays in the form of a thin wafer defining a singly warped figure arched in a first direction and unarched in a second direction perpendicular thereto, said wafer having a lattice structure defining crystal atomic planes warped in both said directions.

10. A focusing crystal for X-rays as set forth in claim 9 wherein: the contour of said crystal atomic planes is substantially parallel to the arched surface of the wafer in said first direction, and the contour of said crystal atomic planes in said second direction define arcs of which the unarched surface of said wafer in said second direction defines chords.

11. A focusing crystal for X-rays as set forth in claim 9 wherein: said crystal atomic planes traverse said wafer and are disposed approximately edgewise in said first direction, and are non-parallel in said second direction.

12. A focusing crystal for X-rays as set forth in claim 9 wherein: said crystal atomic planes are so oriented with respect to the surfaces of said wafer as to reflect and focus incident X-rays of preselected wave length.

13. A focusing crystal for X-rays as set forth in claim 9 wherein: said crystal atomic planes are so oriented with respect to the surfaces of the wafer as to transmit and focus X-rays of preselected wave-length therethrough.

14. A focusing crystal for X-rays as set forth in claim 9 wherein: said wafer is flexible whereby the curvature of its arch and corresponding contour of the crystal atomic planes may be varied for altering the focusing characteristics thereof.

15. A focusing crystal for X-rays as set forth in claim 9 wherein: said crystal atomic planes intersect the surface of said warped wafer at such angles as to focus X-rays of a preselected wave-length in a direction of a preselected real focus.

16. A focusing crystal for X-rays as set forth in claim 9 wherein: said crystal atomic planes intersect the surface of said warped wafer at such angles as to focus X-rays of a preselected wave length in a direction of a preselected virtual focus.

17. A method of manufacturing a focusing crystal, characterized by: cutting an initially arched wafer from a crystal block having an undistorted crystal lattice plane; flattening said wafer; then arching said wafer in a transverse direction.

18. A method as set forth in claim 17 wherein: the crystal atomic planes in said crystal block initially define chords across said initially arched wafer, whereby upon flattening said wafer said crystal atomic planes define arcs in one direction, and upon final arching of said wafer in a transverse direction, said crystal atomic planes define arcs in two directions.

19. A method as set forth in claim 17 wherein: the crystal atomic planes extend in parallelism transversely through the initial wafer, whereby upon flattening said wafer said crystal atomic planes are rendered non-parallel, and upon final arching of said wafer in a transverse direction, said crystal atomic planes are curved edgewise.

20. A method as set forth in claim 17 wherein: the initial wafer is so oriented relative to the crystal atomic planes of the crystal block that X-rays of preselected wavelength are reflected to a focus from said finally arched wafer.

21. A method as set forth in claim 17 wherein: the crystal atomic planes extend in parallelism diagonally through the initially arched wafer whereby upon flattening said wafer, said crystal atomic planes are rendered both curved and non-parallel, and upon final arching of said wafer in said transverse direction said crystal atomic planes are given a second, transverse curvature.

22. A method as set forth in claim 17 wherein: the initial wafer is so oriented relative to the crystal atomic planes of said crystal block that X-rays of preselected wave-length are transmitted through and focused by said finally arched wafer.

References Cited in the file of this patent

UNITED STATES PATENTS

| | | |
|---|---|---|
| 1,532,002 | Thomson | Mar. 31, 1925 |
| 1,551,351 | Wayringer | Aug. 25, 1925 |